US011725996B2

(12) United States Patent
Kotovsky et al.

(10) Patent No.: US 11,725,996 B2
(45) Date of Patent: Aug. 15, 2023

(54) MAGNETICALLY COUPLED PRESSURE SENSOR

(71) Applicant: LAWRENCE LIVERMORE NATIONAL SECURITY, LLC, Livermore, CA (US)

(72) Inventors: Jack Kotovsky, Alameda, CA (US); Taylor Bevis, Bothell, WA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 0 days.

(21) Appl. No.: 17/449,168

(22) Filed: Sep. 28, 2021

(65) Prior Publication Data

US 2022/0011188 A1 Jan. 13, 2022

Related U.S. Application Data

(62) Division of application No. 16/393,407, filed on Apr. 24, 2019, now Pat. No. 11,162,861.

(51) Int. Cl.
*G01L 9/14* (2006.01)
*G01L 9/10* (2006.01)
(Continued)

(52) U.S. Cl.
CPC ............... *G01L 9/14* (2013.01); *G01L 9/007* (2013.01); *G01L 9/0051* (2013.01);
(Continued)

(58) Field of Classification Search
CPC ...... G01N 11/16; G01N 11/08; G01N 11/142; G01N 2009/006; G01N 2011/002; G01N 2291/021; G01N 2291/02818; G01N 29/036; G01N 29/222; G01N 29/227; G01N 29/46; G01N 33/28; G01N 33/2888; G01N 33/445; G01N 9/002; G01F 1/74; G01F 1/8404; G01F 1/8409; G01F 1/8413; G01F 1/8422; G01F 1/8427; G01F 1/8436; G01F 1/8445; G01F 1/8472; G01F 1/849; G01F 1/8495; G06F 9/268; G06F 9/30189; G06F 9/30196; G06F 9/328; G06F 9/3869;
(Continued)

(56) References Cited

U.S. PATENT DOCUMENTS 2,719,426 A 10/1955 Lamb et al.
3,382,718 A 5/1968 Bartsch et al.
(Continued)

*Primary Examiner* — John Fitzgerald
*Assistant Examiner* — Gedeon M Kidanu
(74) *Attorney, Agent, or Firm* — Eddie E. Scott

(57) ABSTRACT

Measurement of pressure of a fluid in a vessel using a cantilever spring in the vessel; a magnet connected to the cantilever spring in the vessel; an electromagnet outside of the vessel operatively connected to the magnet and the cantilever spring in the vessel, wherein the electromagnet induces movement of the magnet and the cantilever spring in the vessel, and wherein the movement is related to the pressure of the fluid in the vessel; a receiving coil operatively positioned relative to the magnet, wherein movement of the cantilever spring and the magnet in the vessel creates an electromotive response in the coil; and a controller analyzer connected to the receiving coil, wherein the controller analyzer uses the electromotive response in the coil for measuring the pressure of the fluid in the vessel.

2 Claims, 9 Drawing Sheets

(51) Int. Cl.
*G01L 9/00* (2006.01)
*G01L 9/12* (2006.01)
*G01L 9/02* (2006.01)

(52) U.S. Cl.
CPC .............. *G01L 9/0072* (2013.01); *G01L 9/02* (2013.01); *G01L 9/10* (2013.01); *G01L 9/12* (2013.01)

(58) Field of Classification Search
CPC ......... H01L 27/14609; H01L 27/14641; H01L 27/14645; H04N 5/343; H04N 5/347; H04N 5/37457
See application file for complete search history.

(56) References Cited

U.S. PATENT DOCUMENTS

| | | | |
|---|---|---|---|
| 3,986,388 A | 10/1976 | Stolzy | |
| 5,103,679 A * | 4/1992 | Porter | G01N 11/142 73/54.39 |
| 5,698,773 A | 12/1997 | Blom et al. | |
| 6,067,855 A | 5/2000 | Brown et al. | |
| 6,293,142 B1 | 9/2001 | Pchelnikov et al. | |
| 6,499,353 B1 | 12/2002 | Douglas et al. | |
| 9,869,726 B2 | 1/2018 | Zumstein et al. | |
| 11,162,861 B2 | 11/2021 | Kotovsky et al. | |
| 2004/0255648 A1* | 12/2004 | Sparks | G01N 33/2888 73/54.41 |
| 2005/0087001 A1* | 4/2005 | Irani | G01N 11/08 73/54.04 |
| 2006/0219022 A1 | 10/2006 | Ohta et al. | |
| 2008/0184795 A1 | 8/2008 | Woodard | |
| 2011/0167910 A1* | 7/2011 | Storm | G01F 1/8495 73/152.58 |
| 2014/0151457 A1* | 6/2014 | Wilkerson | B41J 2/04581 73/579 |
| 2015/0160080 A1 | 6/2015 | Fujisawa et al. | |
| 2016/0061678 A1 | 3/2016 | Reverdy et al. | |
| 2016/0108729 A1* | 4/2016 | Li | G01N 11/16 702/54 |

* cited by examiner

MAGNETICALLY COUPLED PRESSURE SENSOR

CROSS-REFERENCE TO RELATED APPLICATIONS

The present application is a Division of application Ser. No. 16/393,407 filed Apr. 24, 2019, entitled "MAGNETICALLY COUPLED PRESSURE SENSOR," the disclosure of which is hereby incorporated by reference in its entirety for all purposes.

AND STATEMENT AS TO RIGHTS TO APPLICATIONS MADE UNDER AND FEDERALLY SPONSORED RESEARCH DEVELOPMENT

The This invention was made with Government support under Contract No. DE-AC52-07NA27344 awarded by the United States Department of Energy. The Government has certain rights in the invention.

BACKGROUND

Field of Endeavor

The present application relates to a method and system of detecting pressure within a closed volume, and more particularly to a non-penetrating method and system using an oscillating cantilever to detect pressure in a closed volume through a wall defining the closed volume.

State of Technology

This section provides background information related to the present disclosure which is not necessarily prior art.

Pressure volumes, pipes, conduits, biologic systems and environments often require that data be accessed without interruption of the integrity of the contained volume. However, it is often difficult to access data from a pressure sensor in such environments. Prior art has attempted hermetic sealing to pass wires or optic fibers through the wall of the volume, but this is sometimes unacceptable or prone to failure.

SUMMARY

Features and advantages of the disclosed apparatus, systems, and methods will become apparent from the following description. Applicant is providing this description, which includes drawings and examples of specific embodiments, to give a broad representation of the apparatus, systems, and methods. Various changes and modifications within the spirit and scope of the application will become apparent to those skilled in the art from this description and by practice of the apparatus, systems, and methods. The scope of the apparatus, systems, and methods is not intended to be limited to the particular forms disclosed and the application covers all modifications, equivalents, and alternatives falling within the spirit and scope of the apparatus, systems, and methods as defined by the claims.

The inventors have developed apparatus, systems, and methods for measuring pressure of a fluid in a vessel. The apparatus, systems, and methods are capable of measuring gas or fluid pressure within a closed volume by magnetically coupling through the wall that defines that volume. In various embodiments the apparatus, systems, and methods are based on an oscillating cantilever that interacts with the contents of the volume. The dynamics of the oscillation depend on the material around the cantilever. The cantilever's motion is driven and interpreted by external electronics that require no direct connection to the cantilever. In various embodiments the apparatus, systems, and methods are based on a sensor located inside of the vessel for sensing the unknown internal pressure of the fluid inside the vessel and a magnetic induction communication system having a first induction coil located inside of the vessel wall and a second induction coil located outside of the vessel wall wherein the magnetic induction communication system communicates the sensed unknown internal pressure of the fluid inside the vessel from the sensor to the first induction coil and from the first induction coil to the second induction coil and from the second induction coil to the receiving unit and from the receiving unit to the controller analyzer for measuring the pressure of the fluid in the vessel.

The apparatus, systems, and methods address the difficulty of accessing data from a pressure sensor in particular environments. Pressure volumes, pipes, conduits, biologic systems and environments often require that data be accessed without interruption of the integrity of the contained volume. Prior art has attempted hermetic sealing to pass wires or optic fibers through the wall of the volume, but this is sometimes unacceptable or prone to failure. The non-penetrating scheme as proposed here addresses these issues. Coupled with this concept of non-penetration is a means of detecting pressure with use of an oscillating cantilever. The overall system is very simple and arguably highly robust for long term use and potentially low cost for disposable applications. The apparatus, systems, and methods are useful for measuring pressure within a closed volume or across a barrier where no penetrations of that barrier are required.

The apparatus, systems, and methods are susceptible to modifications and alternative forms. Specific embodiments are shown by way of example. It is to be understood that the apparatus, systems, and methods are not limited to the particular forms disclosed. The apparatus, systems, and methods cover all modifications, equivalents, and alternatives falling within the spirit and scope of the application as defined by the claims.

BRIEF DESCRIPTION OF THE DRAWINGS

The accompanying drawings, which are incorporated into and constitute a part of the specification, illustrate specific embodiments of the apparatus, systems, and methods and, together with the general description given above, and the detailed description of the specific embodiments, serve to explain the principles of the apparatus, systems, and methods.

DETAILED DESCRIPTION OF SPECIFIC EMBODIMENTS

Figure 1:
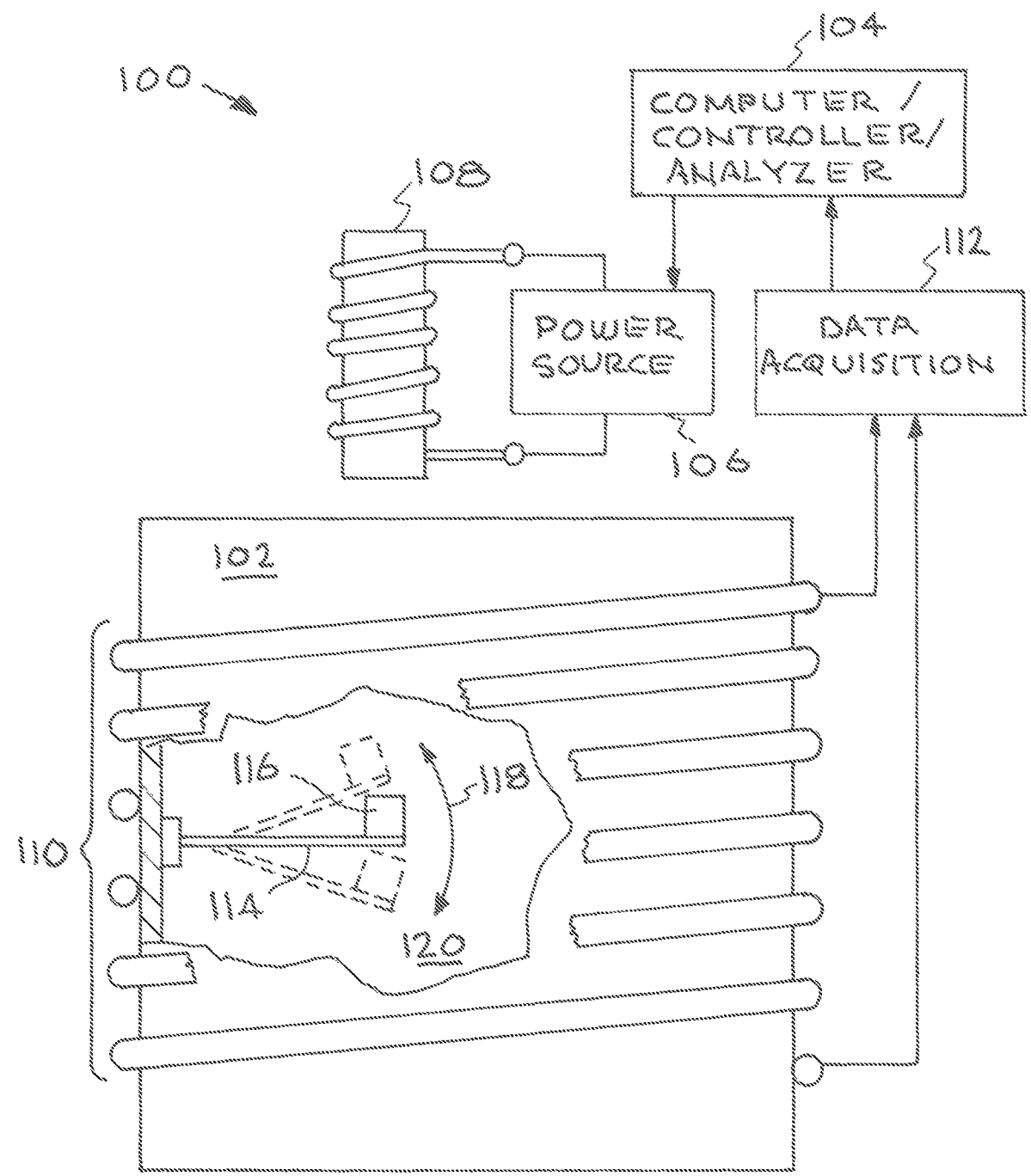
FIG. 1 illustrates an embodiment of Applicants' apparatus, systems, and methods.

Referring to the drawings, to the following detailed description, and to incorporated materials, detailed information about the apparatus, systems, and methods is provided including the description of specific embodiments. The detailed description serves to explain the principles of the apparatus, systems, and methods. The apparatus, systems, and methods are susceptible to modifications and alternative forms. The application is not limited to the particular forms disclosed. The application covers all modifications, equivalents, and alternatives falling within the spirit and scope of the apparatus, systems, and methods as defined by the claims.

The inventors have developed apparatus, systems, and methods for measuring pressure of a fluid in a vessel. The inventors apparatus, systems, and methods include a cantilever spring in the vessel; a magnet connected to the cantilever spring in the vessel; an electromagnet outside of the vessel operatively connected to the magnet and the cantilever spring in the vessel, wherein the electromagnet induces movement of the magnet and the cantilever spring in the vessel, and wherein the movement is related to the pressure of the fluid in the vessel; a receiving coil operatively positioned relative to the magnet, wherein movement of the cantilever spring and the magnet in the vessel creates an electromotive response in the coil; and a controller analyzer connected to the receiving coil, wherein the controller analyzer uses the electromotive response in the coil for measuring the pressure of the fluid in the vessel. The controller analyzer is connected to the electromagnet and adapted to induce harmonic oscillation of the magnet in the vessel wherein the harmonic oscillation of the magnet in the vessel is related to the pressure of the fluid in the vessel. The receiving coil is a magnetic field detector adapted to detect the harmonic oscillation of the magnet in the vessel and create an electromotive response in the coil related to the pressure of the fluid in the vessel.

This apparatus, systems, and methods provide a sensor that measures pressure in a closed volume. The sensor has two components, one that sits inside the closed volume and one that sits outside the closed volume. The two components "communicate" through magnetic coupling only. The coupling can pass through many materials including a closed system that acts as a Faraday cage.

The internal component can take the form of a metallic cantilever. A permanent magnet is mounted at the end of the cantilever. The cantilever is designed to have specific vibrational modes that relate to its magnetic coupling and drive. Finally, the cantilever is also designed to have a cross sectional profile that interacts with the gas or fluid environment it sits in. This interaction provides viscous and mass damping that is the means of pressure sensing.

The external component is electrically driven. It consists of one or two coils. The two-coil version is the simplest incarnation. The driving coil is an electromagnet that produces a driving magnetic field that pushes and/or pulls the permanent magnet at the end of the cantilever. This driving mechanism can be a one-time pulse similar to plucking the end of the cantilever or an oscillating, continuous signal that actively drives the cantilever.

The second coil interacts with the changing magnetic field from the moving permanent magnet on the cantilever. The changing magnetic field in the 'receiving coil' generates an electric current in that coil. Monitoring this current describes the cantilever motion.

As the pressure in the closed volume changes, the natural frequency of cantilever changes due to the gas damping and added mass. Measuring the cantilever ring down from a 'pluck' or finding its new natural frequency by sweeping the driving field, the pressure can be inferred from a calibration.

Referring to FIG. 1, an illustrative view shows an embodiment of Applicants' apparatus, systems, and methods. This embodiment is identified generally by the reference numeral 100. FIG. 1 is an illustrative side view Applicant's magnetically coupled pressure sensor for measuring pressure of a fluid in a vessel. The components of Applicant's pressure sensor apparatus, systems, and methods in FIG. 1 are listed below.

- 100—Magnetically coupled pressure sensor system (MCPSS),
- 102—Vessel,
- 104—Computer controller analyzer,
- 106—Power source,
- 108—Electromagnet,
- 110—Receiving coil,
- 112—Data acquisition module,
- 114—Cantilever spring,
- 116—Magnet,
- 118—Motion arrows, and
- 120—Medium being measured.

The description of the structural components of the Applicant's pressure sensor 100 having been completed, the operation and additional description of the Applicant's pressure sensor will now be considered in greater detail. The magnetically coupled pressure sensor 100 for measuring pressure of a fluid 120 in a vessel 102 uses a cantilever spring 114 located in the vessel 102. A magnet 116 is connected to the cantilever spring 114 in the vessel. In this embodiment the magnet 116 is a discrete magnet positioned at far end of the cantilever spring 114.

An electromagnet 108 outside of the vessel 102 is operatively connected to the magnet 116 and the cantilever spring 114 in the vessel 102. The electromagnet 108 induces movement 118 of the magnet 116 and the cantilever spring 114 in the vessel 102. The movement 118 is related to the pressure of the fluid 120 in the vessel 102.

A receiving coil 110 is operatively positioned relative to the magnet 116. Movement 118 of the cantilever spring 114 and the magnet 116 in the vessel 102 creates an electromotive response in the coil 110. A computer controller analyzer 104 is connected to the receiving coil 110. The computer controller analyzer 104 uses the electromotive response in the coil 110 for measuring the pressure of the fluid 120 in the vessel 102.

The computer controller analyzer 104 is connected to the electromagnet 108 and adapted to induce harmonic oscillation of the magnet 116 in the vessel 102. The harmonic oscillation of the magnet 116 in the vessel 102 is related to the pressure of the fluid 120 in the vessel 102. The receiving coil 110 is a magnetic field detector adapted to detect the harmonic oscillation of the magnet 116 in the vessel 102 and create an electromotive response in the coil 110 related to the pressure of the fluid in the vessel. The pressure of the fluid 120 in the vessel 102 will influence the ring-down of the cantilever by changing the damped natural frequency of oscillation and the pressure changes the rate of ring down.

Figure 2:
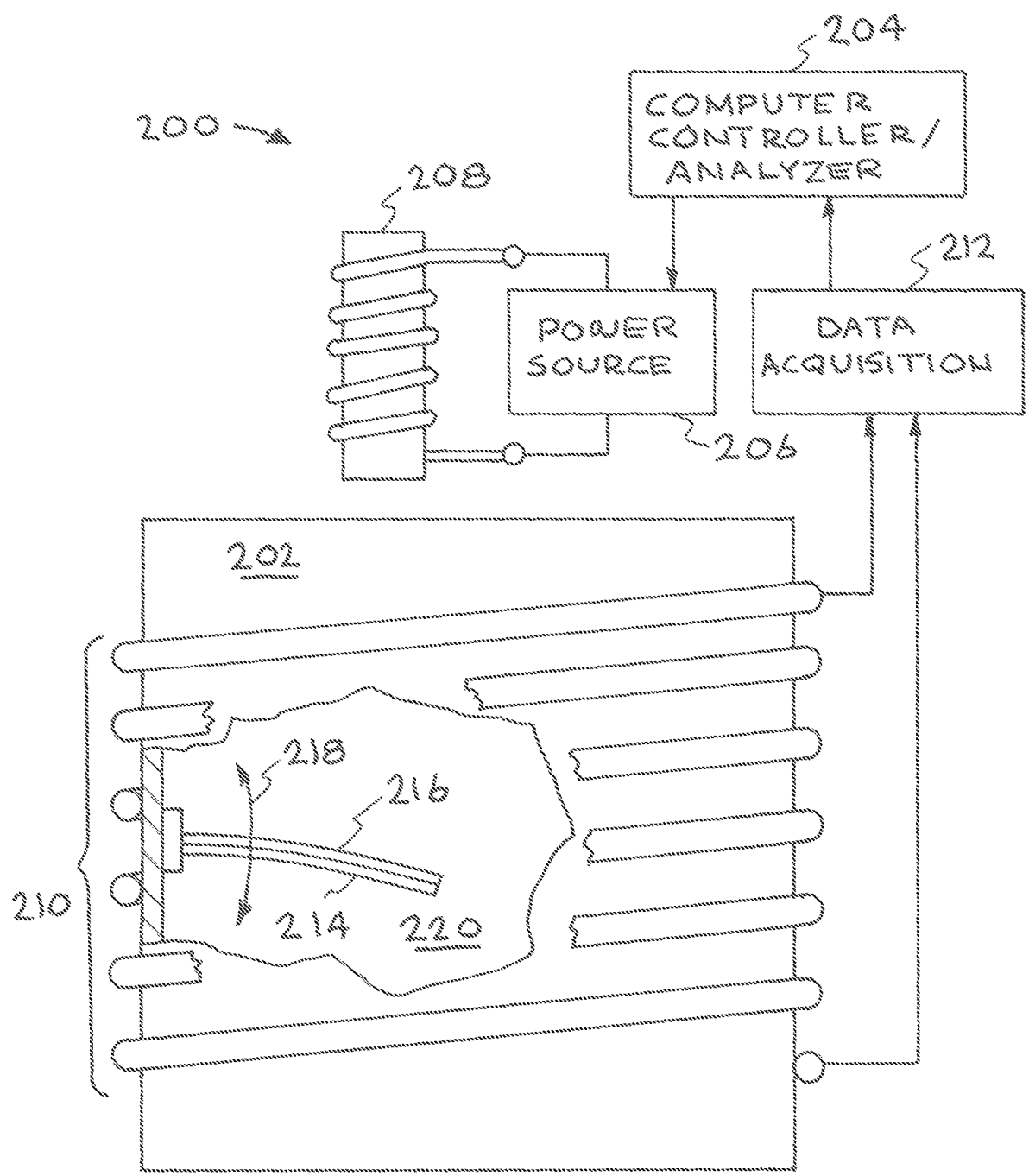
FIG. 2 illustrates another embodiment of Applicants' apparatus, systems, and methods.

Referring to FIG. 2, an illustrative view shows an embodiment of Applicants' apparatus, systems, and methods. This embodiment is identified generally by the reference numeral 200. FIG. 2 is an illustrative side view Applicant's magnetically coupled pressure sensor for measuring pressure of a fluid in a vessel 200. The components of FIG. 2 are listed below.

200—Magnetically coupled pressure sensor system (MCPSS),
    202—Vessel,
    204—Computer controller analyzer,
    206—Power source,
    208—Electromagnet,
    210—Receiving coil,
    212—Data acquisition module,
    214—Cantilever spring,
    216—Magnet,
    218—Motion arrows, and
    220—Medium being measured.

The description of the structural components of the embodiment of Applicant's pressure sensor 200 having been completed, the operation and additional description of the Applicant's pressure sensor 200 will now be considered in greater detail. The magnetically coupled pressure sensor 200 for measuring pressure of a fluid in a vessel uses a cantilever spring 214 located in the vessel. A magnet 216 is connected to the cantilever spring 214 in the vessel. In this embodiment the magnet 216 extends the entire length of the cantilever spring 214.

An electromagnet outside of the vessel is operatively connected to the magnet 216 and the cantilever spring 214 in the vessel. The electromagnet induces movement of the magnet 216 and the cantilever spring 214 in the vessel. The movement is related to the pressure of the fluid in the vessel.

A receiving coil is operatively positioned relative to the magnet 216. Movement of the cantilever spring 214 and the magnet 216 in the vessel creates an electromotive response in the coil. A computer controller analyzer is connected to the receiving coil. The computer controller analyzer uses the electromotive response in the coil for measuring the pressure of the fluid in the vessel.

The computer controller analyzer is connected to the electromagnet and adapted to induce harmonic oscillation of the magnet 216 in the vessel. The harmonic oscillation of the magnet 216 in the vessel is related to the pressure of the fluid in the vessel. The receiving coil is a magnetic field detector adapted to detect the harmonic oscillation of the magnet 216 in the vessel and create an electromotive response in the coil related to the pressure of the fluid in the vessel.

Figure 3:
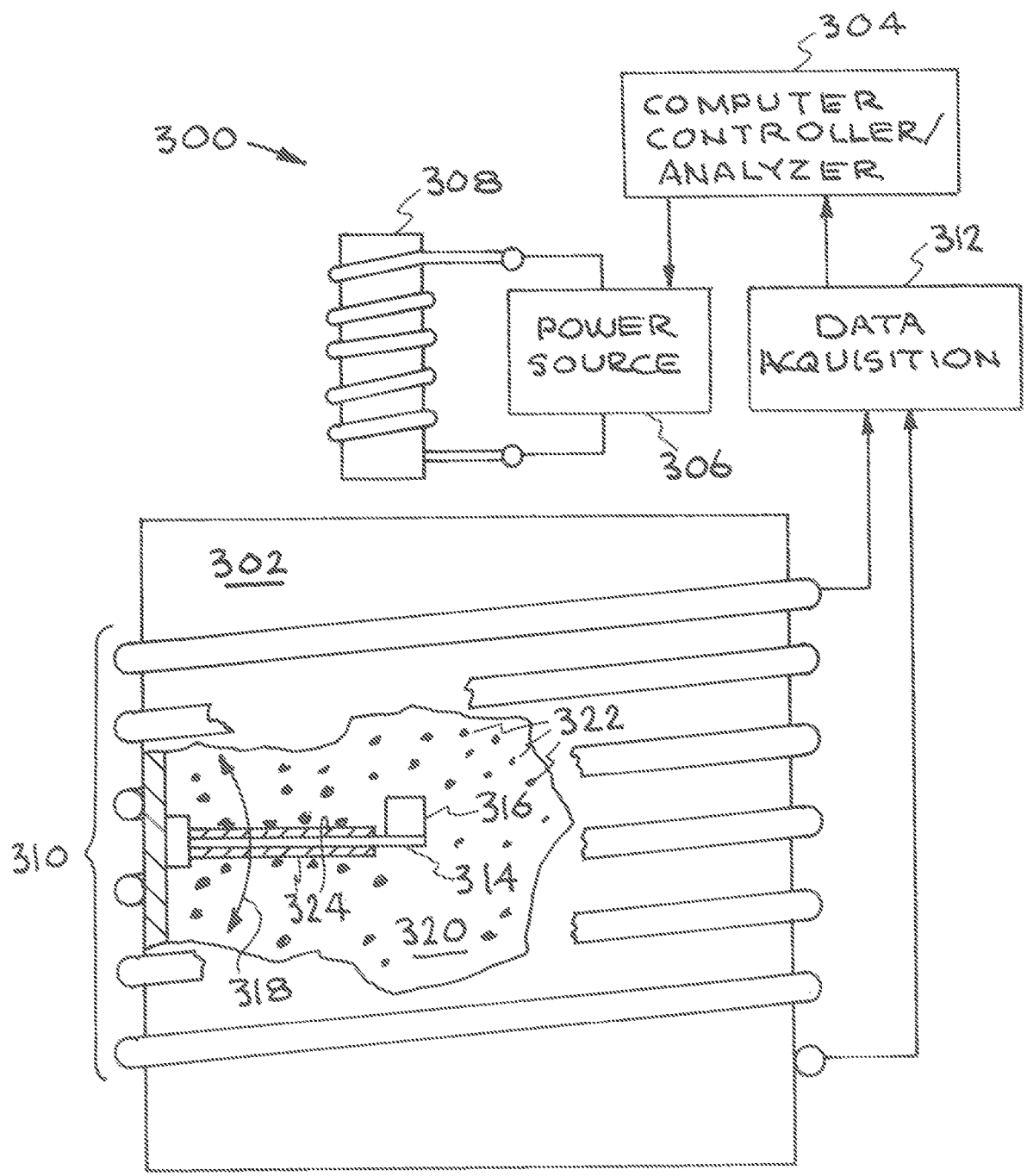
FIG. 3 illustrates yet another embodiment of Applicants' apparatus, systems, and methods.

Referring to FIG. 3, an illustrative view shows an embodiment of Applicants' apparatus, systems, and methods. This embodiment is identified generally by the reference numeral 300. FIG. 3 is an illustrative side view Applicant's magnetically coupled pressure sensor for measuring pressure of a fluid in a vessel. The components of FIG. 3 that differ from the FIG. 1 components are listed below.

300—Magnetically coupled pressure sensor system (MCPSS),
    302—Vessel,
    304—Computer controller analyzer,
    306—Power source,
    308—Electromagnet,
    310—Receiving coil,
    312—Data acquisition module,
    314—Cantilever spring,
    316—Magnet,
    318—Motion arrows,
    320—Medium being measured,
    322—Particles entrained in the medium, and
    324—Coating on cantilever to prevent particles entrained in the medium from adhering to the cantilever, The description of the structural components of the embodiment of Applicant's pressure sensor 300 having been completed, the operation and additional description of the Applicant's pressure sensor 300 will now be considered in greater detail. The magnetically coupled pressure sensor 300 for measuring pressure of a fluid in a vessel uses a cantilever spring 314 located in the vessel. Particles 322 are entrained in the medium. A magnet 316 is connected to the cantilever spring 314 in the vessel. In this embodiment the magnet 316 is a discrete magnet positioned at far end of the cantilever spring 314. A coating 324 on cantilever helps prevent particles 322 entrained in the medium from adhering to the cantilever, An electromagnet outside of the vessel is operatively connected to the magnet 316 and the cantilever spring 314 in the vessel. The electromagnet induces movement of the magnet 316 and the cantilever spring 314 in the vessel. The movement is related to the pressure of the fluid in the vessel.

A receiving coil is operatively positioned relative to the magnet 316. Movement of the cantilever spring 314 and the magnet 316 in the vessel creates an electromotive response in the coil. A computer controller analyzer is connected to the receiving coil. The computer controller analyzer uses the electromotive response in the coil for measuring the pressure of the fluid in the vessel.

The computer controller analyzer is connected to the electromagnet and adapted to induce harmonic oscillation of the magnet 316 in the vessel. The harmonic oscillation of the magnet 316 in the vessel is related to the pressure of the fluid in the vessel. The receiving coil is a magnetic field detector adapted to detect the harmonic oscillation of the magnet 316 in the vessel and create an electromotive response in the coil related to the pressure of the fluid in the vessel.

Figure 4:
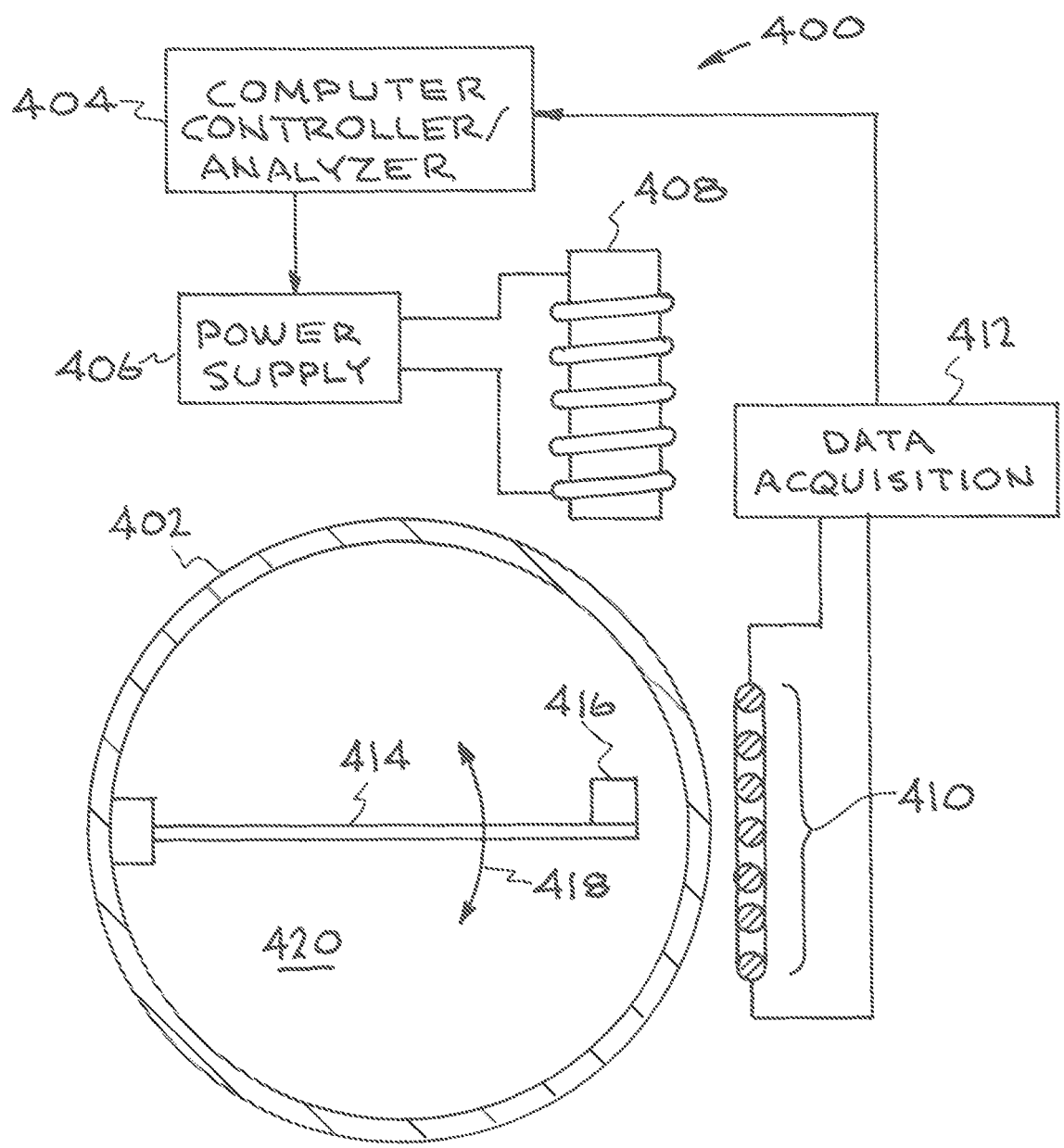
FIG. 4 illustrates an embodiment of Applicants' apparatus, systems, and methods wherein the receiving coil is on one side of the vessel.

Referring to FIG. 4, an illustrative view shows an embodiment of Applicants' apparatus, systems, and methods wherein the receiving coil is on one side of the vessel. This embodiment is identified generally by the reference numeral. FIG. 4 is an illustrative side view Applicant's magnetically coupled pressure sensor for measuring pressure of a fluid in a vessel 402. The components of Applicant's pressure sensor apparatus, systems, and methods in FIG. 4 are listed below.

400—Magnetically coupled pressure sensor system (MCPSS),
    402—Vessel,
    404—Computer controller analyzer,
    406—Power source,
    408—Electromagnet,
    410—Receiving coil,
    412—Data acquisition module,
    414—Cantilever spring,
    416—Magnet,
    418—Motion arrows, and
    420—Medium being measured.

The description of the structural components of the Applicant's pressure sensor 400 having been completed, the operation and additional description of the Applicant's pressure sensor will now be considered in greater detail. The magnetically coupled pressure sensor 400 for measuring pressure of a fluid 420 in a vessel 402 uses a cantilever spring 414 located in the vessel 402. A magnet 416 is connected to the cantilever spring 414 in the vessel. In this embodiment the magnet 416 is a discrete magnet positioned at far end of the cantilever spring 414.

An electromagnet 408 outside of the vessel 402 is operatively connected to the magnet 416 and the cantilever spring 414 in the vessel 402. The electromagnet 408 induces movement 418 of the magnet 416 and the cantilever spring 414 in the vessel 402. The movement 418 is related to the pressure of the fluid 420 in the vessel 402.

A receiving coil 410 is operatively positioned relative to the magnet 416. The receiving coil 410 in this embodiment is on one side of the vessel 402. Movement 418 of the cantilever spring 414 and the magnet 416 in the vessel 402 creates an electromotive response in the coil 410. A computer controller analyzer 404 is connected to the receiving coil 410. The computer controller analyzer 404 uses the electromotive response in the coil 410 for measuring the pressure of the fluid 420 in the vessel 402.

The computer controller analyzer 404 is connected to the electromagnet 408 and adapted to induce harmonic oscillation of the magnet 416 in the vessel 402. The harmonic oscillation of the magnet 416 in the vessel 402 is related to the pressure of the fluid 420 in the vessel 402. The receiving coil 410 is a magnetic field detector adapted to detect the harmonic oscillation of the magnet 416 in the vessel 402 and create an electromotive response in the coil 410 related to the pressure of the fluid in the vessel.

Figure 5:
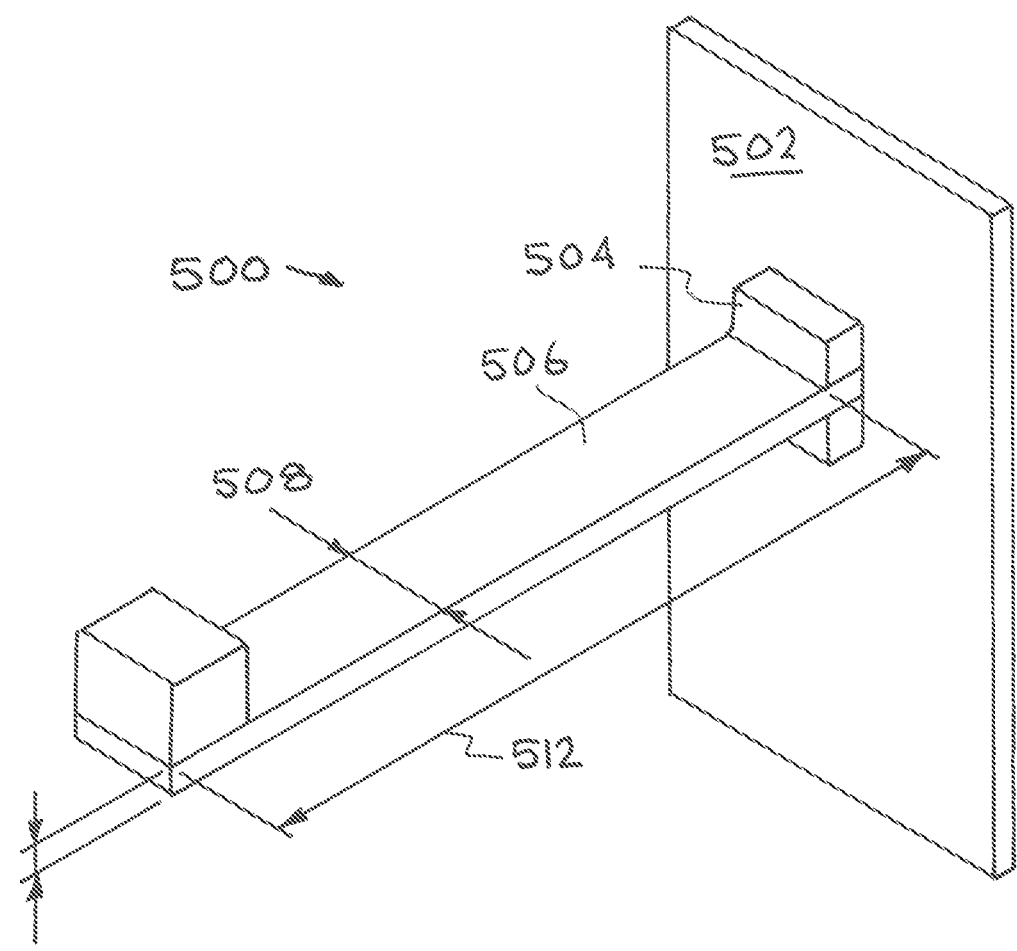
FIG. 5 illustrates the cantilever in greater detail.

Referring to FIG. 5, an illustrative view shows the cantilever in greater detail. This embodiment is identified generally by the reference numeral 500. The components of Applicant's pressure sensor apparatus, systems, and methods in FIG. 5 are listed below.

- 500—Cantilever spring system,
- 502—Vessel,
- 504—Attachment,
- 506—Cantilever spring,
- 508—Width,
- 510—Thickness, and
- 512—Length.

The description of the structural components of the Applicant's cantilever spring system 500 having been completed, the operation and additional description of the Applicant's cantilever spring system 500 will now be considered in greater detail. Applicant's apparatus, systems, and methods provide a magnetically coupled pressure sensor for measuring pressure of a fluid in a vessel 502 uses a cantilever spring 506 located in the vessel 502. The fixed end of the cantilever spring 506 is connected to the vessel 502 by an attachment. The moveable spring end of the cantilever spring 506 is within the vessel 502. The cantilever spring 506 has a width 508, a thickness 510, and a length 512.

As previously explained an electromagnet outside of the vessel 502 is operatively connected to the magnet on the cantilever spring 506 in the vessel 502. The electromagnet induces movement of the magnet and the cantilever spring 506 in the vessel 502. The movement is related to the pressure of the fluid in the vessel 502. A receiving coil is operatively positioned relative to the magnet. Movement of the cantilever spring 506 and the magnet in the vessel 502 creates an electromotive response in the receiving coil. A computer controller analyzer uses the electromotive response in the receiving coil for measuring the pressure of the fluid in the vessel 502. The harmonic oscillation of the magnet in the vessel 502 is related to the pressure of the fluid in the vessel 502. The receiving coil is a magnetic field detector adapted to detect the harmonic oscillation of the magnet in the vessel 502 and create an electromotive response in the coil related to the pressure of the fluid in the vessel.

Figure 6:
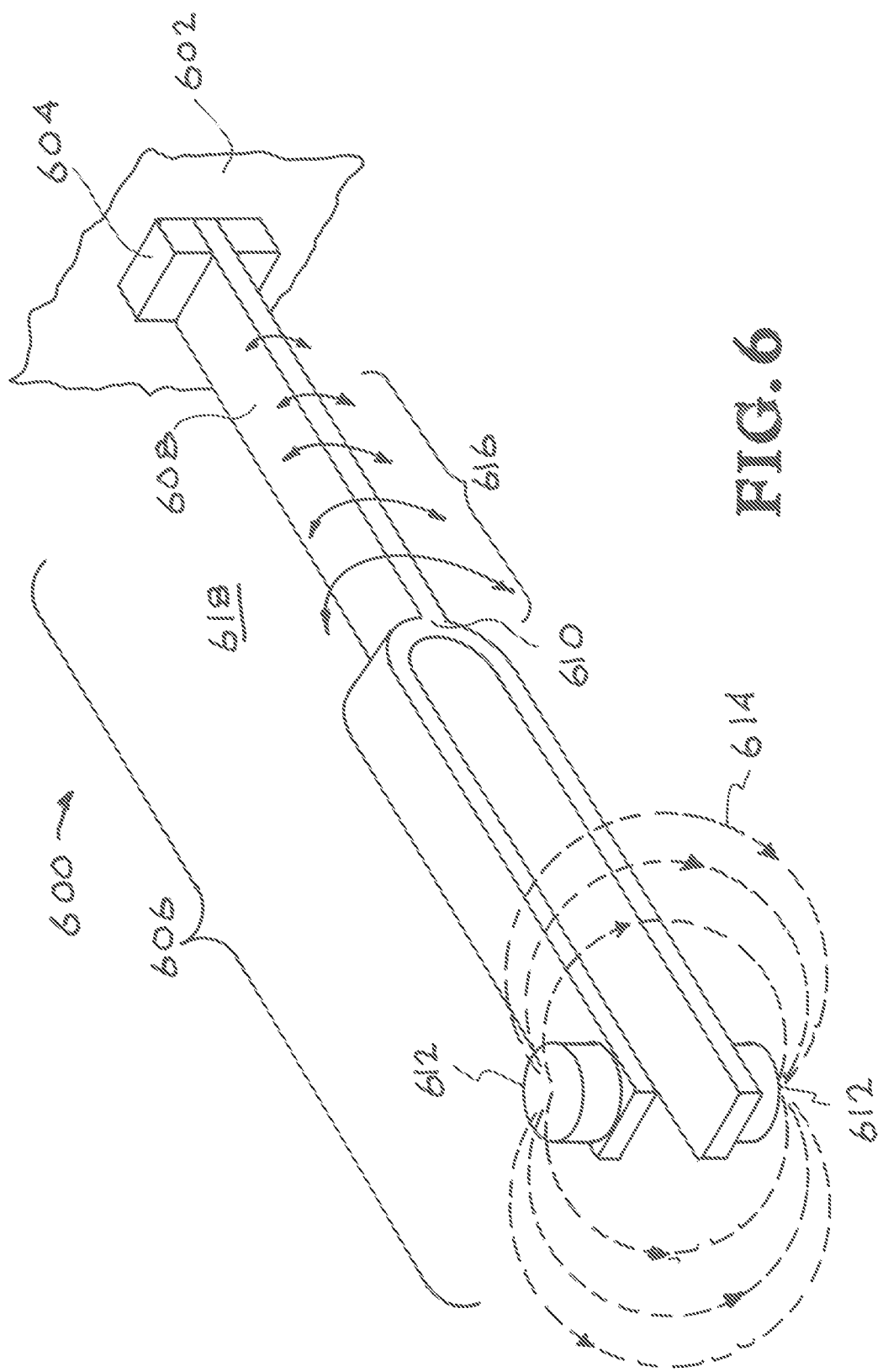
FIG. 6 illustrates another embodiment of Applicants' apparatus, systems, and methods utilizing a sensor with the shape of a tuning fork.

Referring to FIG. 6, an illustrative view shows another embodiment of Applicants' apparatus, systems, and methods utilizing a sensor with the shape of a tuning fork. This embodiment is identified generally by the reference numeral 600. The components of Applicant's embodiment 600 illustrated in FIG. 6 are listed below.

- 602—Vessel,
- 604—Attachment to vessel,
- 606—Sensor with the shape of a tuning fork,
- 608—Tuning fork handle,
- 610—Tuning fork portion,
- 612—Magnets,
- 614—Magnet field,
- 616—Ring down, and
- 618—Fluid being measured.

The description of the structural components of the Applicants' apparatus, systems, and methods utilizing a sensor with the shape of a tuning fork having been completed, the operation and additional description of the embodiment 600 will now be considered in greater detail. Applicant's apparatus, systems, and methods 600 provide a magnetically coupled pressure sensor 606 in the shape of a tuning fork. The sensor 606 measures the pressure of a fluid 618 in a vessel 602 using a cantilever spring sensor 606 having the shape of a tuning fork. The sensor 606 has a tuning fork handle 608 and a tuning fork portion 610. Magnets 612 are connected to the tuning fork portion 610.

As previously illustrated and describe, a receiving coil is operatively positioned relative to the magnets 612. Movement of the tuning fork handle 608 and the tuning fork portion 610 in the vessel 602 creates an electromotive response in the receiving coil. A computer controller analyzer is connected to the receiving coil. The computer controller analyzer uses the electromotive response in the coil for measuring the pressure of the fluid 618 in the vessel 602.

Applicants' apparatus, systems, and methods can measure the pressure of the fluid 618 using harmonic oscillation of the magnets 612 in the vessel 602. Applicants' apparatus, systems, and methods can also measure the pressure of the fluid 618 using ring down 616. Ring-down measurement is a well known form of measurement. The ring down 616 measurement of the pressure of the fluid 618 in the vessel 602 is achieved by determining the time between initiation of movement of the sensor 606 and when the movement stops. The ring down time is related to the pressure of the fluid 618 in the vessel 602. The tuning fork 610 offers the advantage of a system with less loss to the vessel as the oscillatory energy is better contained within the tuning fork 610 due to its mechanical balance. Additionally, if the blades of the tuning fork 610 are very close together, squeeze film damping can improve the sensitivity of the device as the viscous loading of the oscillating beam is exaggerated.

Figure 7:
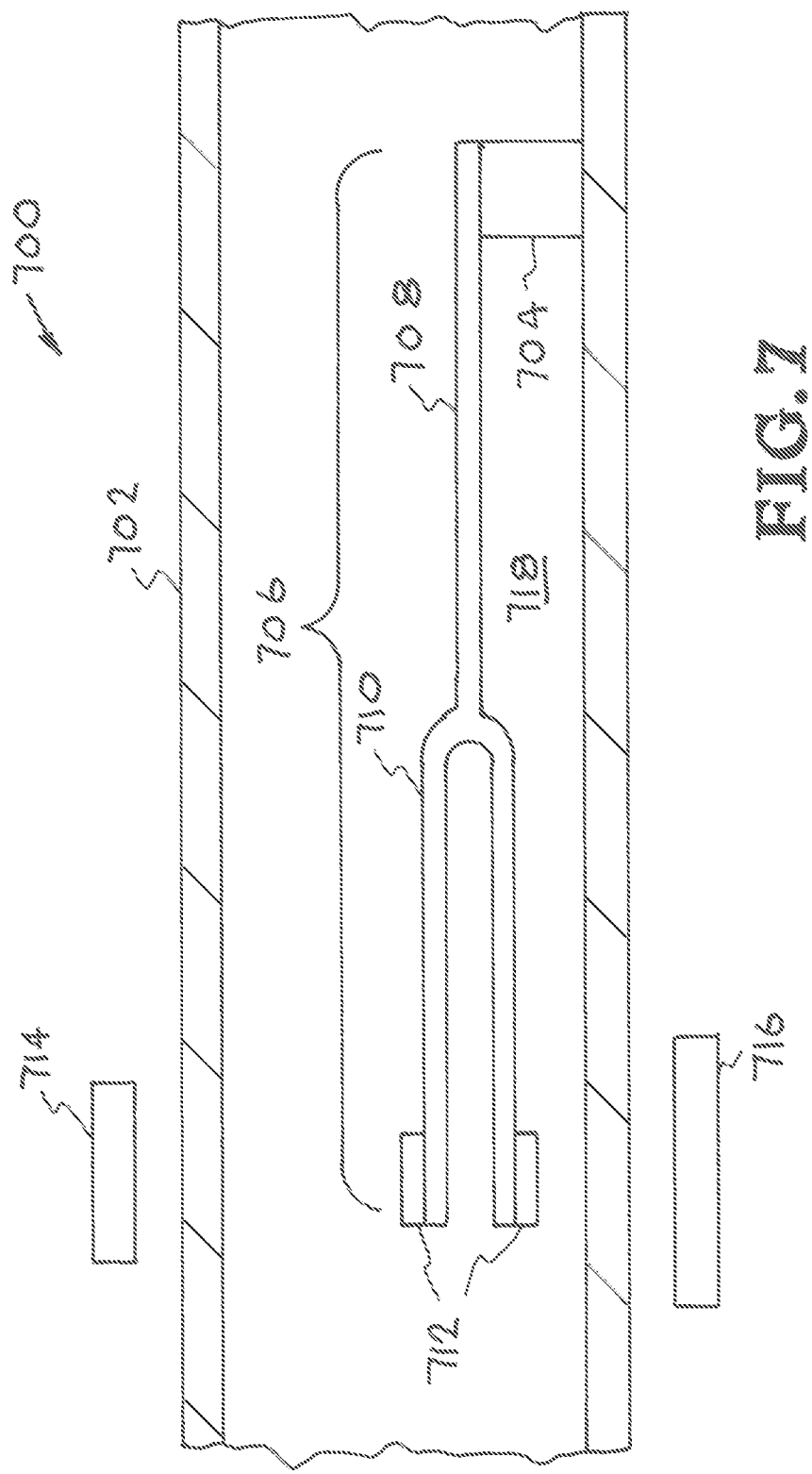
FIG. 7 illustrates an embodiment of Applicants' apparatus, systems, and methods utilizing a sensor with the shape of a tuning fork located inside a vessel and a receiving coil located outside the vessel.

Referring to FIG. 7, an illustrative view shows another embodiment of Applicants' apparatus, systems, and methods. This embodiment utilizes a sensor with the shape of a tuning fork with the sensor located inside a vessel and a receiving coil located outside the vessel. This embodiment is identified generally by the reference numeral 700. The components of Applicant's embodiment 700 illustrated in FIG. 7 are listed below.

702—Vessel,
704—Attachment to vessel,
706—Sensor with the shape of a tuning fork,
708—Tuning fork handle,
710—Tuning fork portion,
712—Magnets,
714—Excitation coil,
716—Pick up coil, and
718—Fluid being measured.

The description of the structural components of the Applicants' apparatus, systems, and methods utilizing a sensor with the shape of a tuning fork having been completed, the operation and additional description of the embodiment 700 will now be considered in greater detail. Applicant's apparatus, systems, and methods 700 provide a magnetically coupled pressure sensor 706 in the shape of a tuning fork. The sensor 706 measures the pressure of a fluid 718 in a vessel 702 using a cantilever spring sensor 706 having the shape of a tuning fork. The sensor 706 has a tuning fork handle 708 and a tuning fork portion 710. Magnets 712 are connected to the tuning fork portion 710.

An excitation coil 714 is located outside of the vessel 702 and is operatively positioned relative to the sensor 706. A receiving coil 716 is located outside of the vessel 702 and is operatively positioned relative to the sensor 706. Movement of the sensor 706 in the vessel 702 is initiated by the excitation coil 714. Movement of the sensor 706 in the vessel 702 creates an electromotive response in the receiving coil 716.

As previously illustrated and explained, a computer controller analyzer is connected to the receiving coil 716. The computer controller analyzer uses the electromotive response in the coil 716 for measuring the pressure of the fluid 718 in the vessel 702.

Applicants' apparatus, systems, and methods can measure the pressure of the fluid 718 using harmonic oscillation of the magnets 712 in the vessel 702. Applicants' apparatus, systems, and methods can also measure the pressure of the fluid 718 using ring down. Ring-down measurement is a well known form of measurement. The ring down measurement of the pressure of the fluid 718 in the vessel 702 is achieved by determining the time between initiation of movement of the sensor 706 and when the movement stops. The ring down time is related to the pressure of the fluid 718 in the vessel 702.

Figure 8:
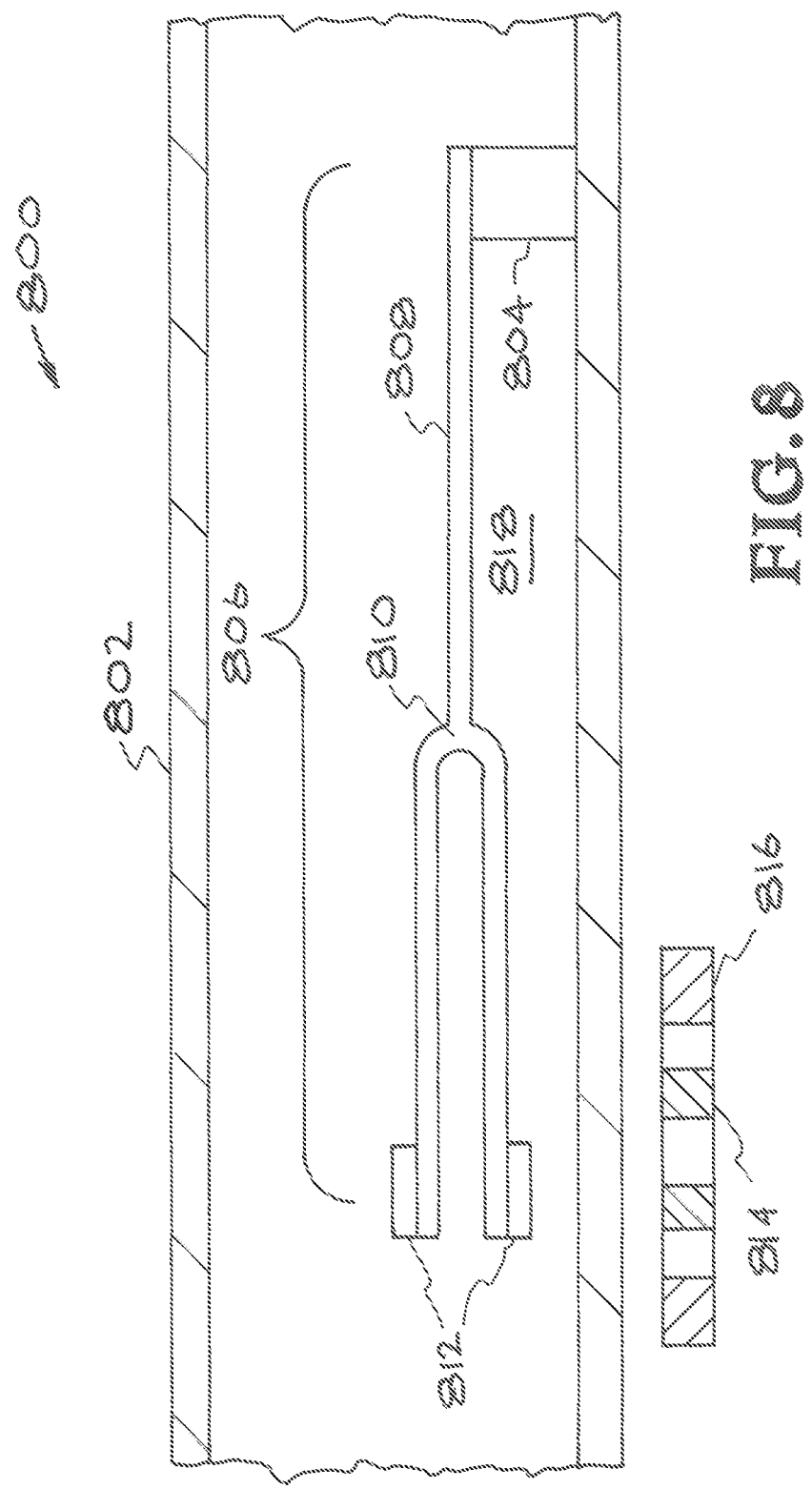
FIG. 8 illustrates yet another embodiment of Applicants' apparatus, systems, and methods utilizing a sensor with the shape of a tuning fork inside a vessel and an excitation coil and a receiving coil outside the vessel.

Referring to FIG. 8, an illustrative view shows another embodiment of Applicants' apparatus, systems, and methods. This embodiment utilizes a sensor with the shape of a tuning fork with the sensor located inside a vessel and an excitation coil and a receiving coil located next to each other outside the vessel. This embodiment is identified generally by the reference numeral 800. The components of Applicant's embodiment 800 illustrated in FIG. 8 are listed below.

802—Vessel,
804—Attachment to vessel,
806—Sensor with the shape of a tuning fork,
808—Tuning fork handle,
810—Tuning fork portion,
812—Magnets,
814—Excitation coil,
816—Pick up coil, and
818—Fluid being measured.

The description of the structural components of the Applicants' apparatus, systems, and methods utilizing a sensor with the shape of a tuning fork having been completed, the operation and additional description of the embodiment 800 will now be considered in greater detail. Applicant's apparatus, systems, and methods 800 provide a magnetically coupled pressure sensor 806 in the shape of a tuning fork. The sensor 806 measures the pressure of a fluid 818 in a vessel 802 using a cantilever spring sensor 806 having the shape of a tuning fork. The sensor 806 has a tuning fork handle 808 and a tuning fork portion 810. Magnets 812 are connected to the tuning fork portion 810.

An excitation coil 814 and a receiving coil (pick up coil) 816 are located outside of the vessel 802 and are operatively positioned relative to the sensor 806. The excitation coil 814 and the receiving coil 816 are located next to each other outside the vessel 802. Movement of the sensor 806 in the vessel 802 is initiated by the excitation coil 814. Movement of the sensor 806 in the vessel 802 creates an electromotive response in the receiving coil 816.

As previously illustrated and explained, a computer controller analyzer is connected to the receiving coil 816. The computer controller analyzer uses the electromotive response in the coil 816 for measuring the pressure of the fluid 818 in the vessel 802.

Applicants' apparatus, systems, and methods can measure the pressure of the fluid 818 using harmonic oscillation of the magnets 812 in the vessel 802. Applicants' apparatus, systems, and methods can also measure the pressure of the fluid 818 using ring down. Ring-down measurement is a well known form of measurement. The ring down measurement of the pressure of the fluid 818 in the vessel 802 is achieved by determining the time between initiation of movement of the sensor 806 and when the movement stops. The ring down time is related to the pressure of the fluid 818 in the vessel 802.

Figure 9:
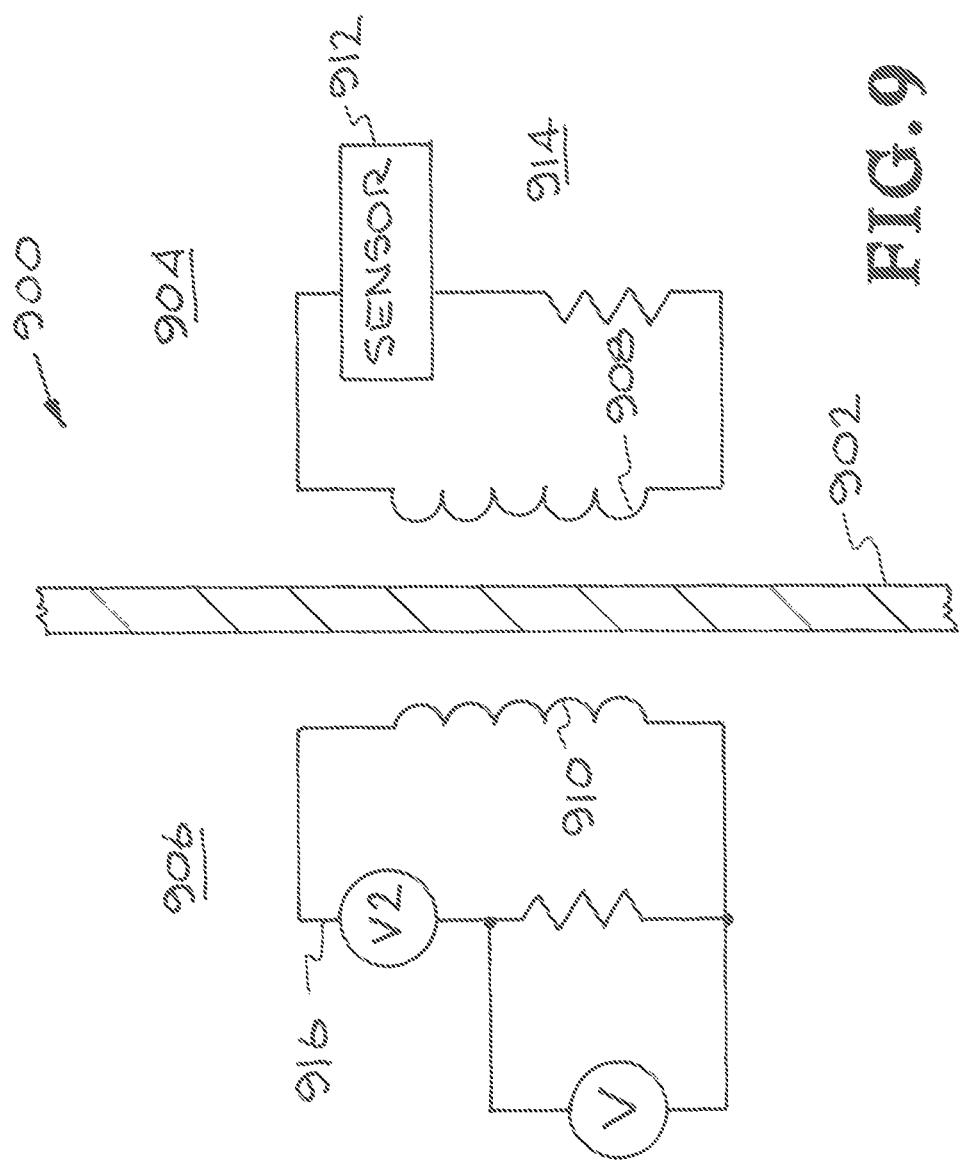
FIG. 9 illustrates an embodiment of Applicants' apparatus, systems, and methods utilizing a sensor and a transmitting coil inside a vessel and a receiving coil outside the vessel.

Referring to FIG. 9, an illustrative view shows an embodiment of Applicants' apparatus, systems, and methods that utilizes a sensor inside a vessel and a receiving coil outside the vessel. The apparatus, systems and methods are designated generally by the reference numeral 900. The components of Applicant's embodiment 900 illustrated in FIG. 9 are listed below.

902—Vessel wall,
904—Unknown internal pressure,
906—External pressure ambient,
908—Internal coil,
910—External coil,
912—Sensor
914—Medium being measured, and
916—Measuring circuit.

The description of the structural components of the Applicant's apparatus, systems, and methods that utilizes a sensor inside a vessel and a receiving coil outside the vessel 900 having been completed, the operation and additional description of the Applicant's apparatus, systems, and methods will now be considered in greater detail.

An unknown internal pressure 904 of a fluid 914 inside of a vessel is measured by sensor 912 and the measured value is transmitted through the vessel wall 902 by the internal coil 908 that is coupled to the external coil 910. The external pressure 906 is ambient. Measuring circuit 916 receives the measurement. The sensor 912 can be a capacitive or resistive diaphragm device that varies with pressure. A change in resistance or capacitance will change the harmonic frequency of the Resistor-Inductor-Capacitor (RLC) circuit. This frequency can be determined by scanning the driving circuit to look for resonance and thus determine the variable quantity (R or C) that is calibrated to pressure. This incarnation of the device works equally well in a liquid or gas environment.

Although the description above contains many details and specifics, these should not be construed as limiting the scope of the application but as merely providing illustrations of some of the presently preferred embodiments of the apparatus, systems, and methods. Other implementations, enhancements and variations can be made based on what is described and illustrated in this patent document. The features of the embodiments described herein may be combined in all possible combinations of methods, apparatus, modules, systems, and computer program products. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination. Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described above should not be understood as requiring such separation in all embodiments.

Therefore, it will be appreciated that the scope of the present application fully encompasses other embodiments which may become obvious to those skilled in the art. In the claims, reference to an element in the singular is not intended to mean "one and only one" unless explicitly so stated, but rather "one or more." All structural and functional equivalents to the elements of the above-described preferred embodiment that are known to those of ordinary skill in the art are expressly incorporated herein by reference and are intended to be encompassed by the present claims. Moreover, it is not necessary for a device to address each and every problem sought to be solved by the present apparatus, systems, and methods, for it to be encompassed by the present claims. Furthermore, no element or component in the present disclosure is intended to be dedicated to the public regardless of whether the element or component is explicitly recited in the claims. No claim element herein is to be construed under the provisions of 35 U.S.C. 112, sixth paragraph, unless the element is expressly recited using the phrase "means for."

While the apparatus, systems, and methods may be susceptible to various modifications and alternative forms, specific embodiments have been shown by way of example in the drawings and have been described in detail herein. However, it should be understood that the application is not intended to be limited to the particular forms disclosed. Rather, the application is to cover all modifications, equivalents, and alternatives falling within the spirit and scope of the application as defined by the following appended claims.

The invention claimed is:

1. An apparatus for measuring unknown internal pressure of a fluid inside of a vessel wherein the vessel has a vessel wall, comprising:
    a sensor located inside of the vessel for sensing the unknown internal pressure of the fluid inside the vessel wherein said sensor is a resistive sensor;
    a receiving unit located outside of the vessel;
    a controller analyzer operatively connected to said receiving unit, and
    a magnetic induction communication system having a first induction coil located inside of the vessel wall and a second induction coil located outside of the vessel wall, wherein said magnetic induction communication system is operatively connected to said sensor and said receiving unit and wherein said magnetic induction communication system communicates said sensed unknown internal pressure of the fluid inside the vessel from said sensor to said first induction and from said first induction coil to said second induction coil and from said second induction coil to said receiving unit and from said receiving unit to said controller analyzer for measuring the pressure of the fluid in the vessel.

2. An apparatus for measuring unknown internal pressure of a fluid inside of a vessel of wherein the vessel has a vessel wall, comprising:
    a sensor located inside of the vessel for sensing the unknown internal pressure of the fluid inside the vessel wherein said sensor is a capacitive sensor and wherein said sensor includes a diaphragm that responds to the unknown internal pressure of the fluid inside of the vessel;
    a receiving unit located outside of the vessel;
    a controller analyzer operatively connected to said receiving unit, and
    a magnetic induction communication system having a first induction coil located inside of the vessel wall and a second induction coil located outside of the vessel wall, wherein said magnetic induction communication system is operatively connected to said sensor and said receiving unit and wherein said magnetic induction communication system communicates said sensed unknown internal pressure of the fluid inside the vessel from said sensor to said first induction and from said first induction coil to said second induction coil and from said second induction coil to said receiving unit and from said receiving unit to said controller analyzer for measuring the pressure of the fluid in the vessel.

* * * * *